J. H. McNUTT.
LAND ANCHOR.
APPLICATION FILED APR. 29, 1908.
912,018.
Patented Feb. 9, 1909.
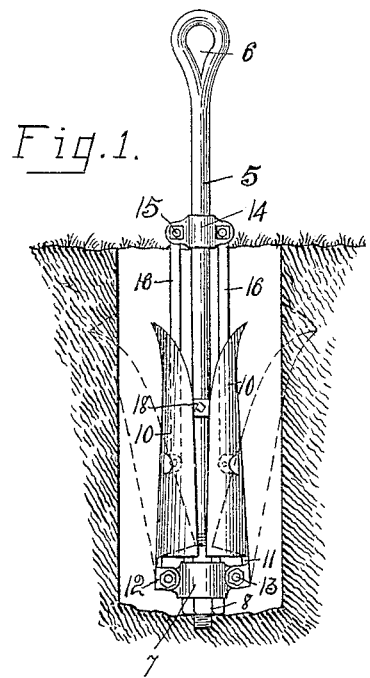
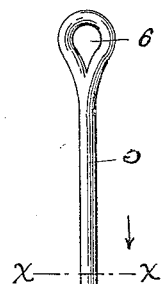
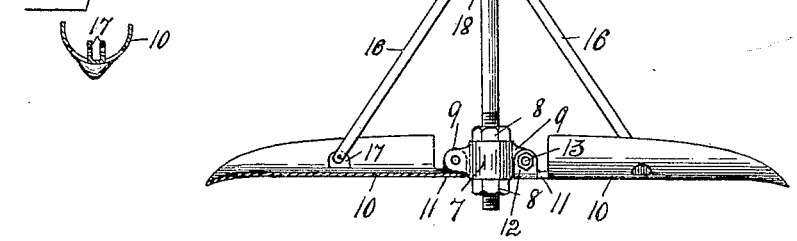
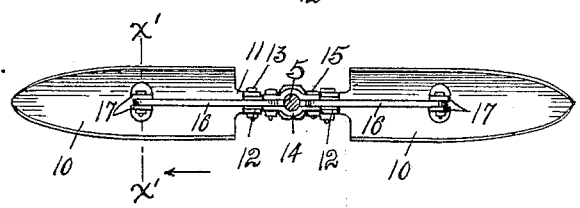
Witnesses:
D. C. Walter
Cornell Schreiber
Inventor
John H. McNutt,
By Owen & Owen,
His attys.

UNITED STATES PATENT OFFICE.

JOHN H. McNUTT, OF TOLEDO, OHIO, ASSIGNOR OF ONE-HALF TO JAMES CASSIDY, OF TOLEDO, OHIO.

LAND-ANCHOR.

No. 912,018.      Specification of Letters Patent.      Patented Feb. 9, 1909.

Application filed April 29, 1908. Serial No. 429,820.

*To all whom it may concern:*

Be it known that I, JOHN H. McNUTT, a citizen of the United States, and a resident of Toledo, in the county of Lucas and State of Ohio, have invented a certain new and useful Land-Anchor; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved ground anchor, and particularly to the class of anchors to which the guy wires or ropes of telephones, telegraph poles, or the like, can be attached, and has for its object the provision of an improved article of this class which is efficient in its operation, simple and durable in its construction, and cheap and easy to manufacture.

The operation, construction and arrangement of the parts of the invention are fully described in the following specification, and illustrated in the accompanying drawings, in which,—

Figure 1 is a side elevation of the anchor positioned in a hole and having its wings closed against its draft-rod or stem, and shown in dotted lines as having their points pressed outwardly against the walls of the hole. Fig. 2 is a side elevation of the anchor in open position with one wing in longitudinal section. Fig. 3 is a section on the line $x$ $x$ in Fig. 2, and Fig. 4 is a cross-section of one of the wings on the line $x'$ $x'$ in Fig. 3.

Referring to the drawings, 5 designates the draft-rod or stem of the device, which has its lower end threaded and its upper end provided with an eye 6 to receive the guy-rope, cable, or other brace. Threaded to, or otherwise suitably mounted on, the lower end of the rod 5 is the head or block 7, which is held in fixed position on the rod by the action of the opposing jam nuts 8 thereon, and is formed on opposite sides of the rod with ears 9 to which the inner ends of the anchor-wings or arms 10, 10 are pivoted. While the wings may be cast, they are preferably formed of sheet-metal, and are made substantially U-shape or curved in cross-section with their outer ends merging into a point and bent downwardly or in opposition to the concaved sides thereof to adapt them when in contact with the walls of a hole and the rod is drawn outwardly to have an expanding or spreading action therein, whereby they are firmly embedded in the solid ground. It is found that by forming the wings in U-shape or longitudinally concaved on their upper surfaces for substantially their entire lengths a much more efficient anchorage is provided than if they are flat or of other construction. The wings 10 are formed at their inner ends with integral hinge-extensions 11 having ears 12 turned up from their sides and embracing the side of the ears 9 of the head or block 7. These ears are pivotally connected by a bolt or pin 13 passing through registering apertures therein, as shown.

Mounted for free reciprocatory movement on the draft-rod above the head 7 is a cross-head 14, which preferably comprises two sections that are held together by bolts or pins 15 and have portions fashioned to fit the sides of said rod. The cross-head 14 is connected to the wings or arms 10 by the links or rods 16, which have their upper ends pivoted to the bolts 15 between the sections of the cross-head and their lower ends pivoted between ears 17, which are preferably turned up from the metal of the wings 10, as shown. A stop-collar 18 on the rod 5 coacts with the cross-head to limit its lowering movement relative to the rod so that the wings in their opening movements are brought to a stop when they stand in substantially perpendicular relation to the rod, thus rigidly holding the wings against a further opening when strain is applied thereto.

In practice, the anchor is placed in a hole with its wings folded up against the draft-rod thereof, and during the tamping operation, as the hole is filled in around the anchor, the wings are forced partly open with their outwardly turned points penetrating the walls of the hole. It is thus apparent that an outward movement of the rod will effect an opening or spreading action of the wings, which is not stopped until the cross-head 14 comes in contact with the stop-collar 18, and that the major stress on the wings is then distributed to the rod through the links 16.

I wish it to be understood that I do not desire to limit myself to the exact construction and arrangement of the parts shown and described, as obvious modifications will occur to persons skilled in the art.

Having thus described my invention, what I claim as new and desire to secure by Letters Patent, is,—

In combination in an anchor, a draft-rod having its lower end threaded, a block carried by said end and having ears projecting in opposite directions therefrom, means co-acting with the block to retain it fixed to the rod, a pair of wings, which are curved in cross-section and have their outer ends pointed and bent in opposition to the concaved side thereof, said wings having their inner ends formed with ears which are pivoted to the ears on the block and provided on the inner sides of their bodies with ears, a cross-head carried by the draft-rod for longitudinal movement thereon, a stop on the rod limiting the movement of the cross-head toward said block, and links pivotally connecting the cross-head and the ears on the bodies of the wings, substantially as described.

In testimony whereof I have hereunto signed my name to this specification in the presence of two subscribing witnesses.

JOHN H. McNUTT.

Witnesses:
C. W. OWEN,
HAZEL B. HIETT.